United States Patent
Akshara

(10) Patent No.: US 10,310,749 B2
(45) Date of Patent: Jun. 4, 2019

(54) SYSTEM AND METHOD FOR PREDICTING DISK FAILURE

(71) Applicant: NetScout Systems Texas, LLC, Westford, MA (US)

(72) Inventor: Fnu Akshara, Richarson, TX (US)

(73) Assignee: NetScout Systems Texas, LLC, Plano, TX (US)

( * ) Notice: Subject to any disclaimer, the term of this patent is extended or adjusted under 35 U.S.C. 154(b) by 0 days.

(21) Appl. No.: 15/268,221

(22) Filed: Sep. 16, 2016

(65) Prior Publication Data

US 2018/0081571 A1 Mar. 22, 2018

(51) Int. Cl.
*G06F 3/06* (2006.01)
*G06F 11/00* (2006.01)
(Continued)

(52) U.S. Cl.
CPC .......... *G06F 3/0619* (2013.01); *G06F 3/0653* (2013.01); *G06F 3/0689* (2013.01);
(Continued)

(58) Field of Classification Search
CPC .... G06F 3/0607; G06F 3/0659; G06F 3/0661; G06F 3/0676; G06F 21/31; G06F 21/554;
(Continued)

(56) References Cited

U.S. PATENT DOCUMENTS

| | | | | |
|---|---|---|---|---|
| 7,539,597 B2 * | 5/2009 | Wegerich | ........... | G05B 23/0254 700/108 |
| 7,707,060 B2 * | 4/2010 | Chainer | ............. | G06Q 30/0201 360/31 |

(Continued)

OTHER PUBLICATIONS

Extended European Search Report for European Patent Application No. 17191480.7, dated Jun. 8, 2018.

*Primary Examiner* — Mohamed M Gebril
(74) *Attorney, Agent, or Firm* — Locke Lord LLP; Scott D. Wofsy; Christopher J. Capelli

(57) ABSTRACT

A computer-implemented method for predicting failure of a disk that is configured to store digital data is provided. The method includes receiving health status data from a monitor that measures health status of the disk, the health status data including factor values associated with a plurality of respective disk failure factors, receiving an overall factor weight assigned to each disk failure factor, wherein the overall factor weight indicates the contribution of that factor in predicting a failure of the disk, and receiving, for each disk failure factor, a weight factor assigned to each bin of a set of bins, wherein each bin has an assigned range of factor values, the weight factor assigned to each bin indicating a probability of disk failure based on empirical results. The operations further include, for each disk failure factor, determining a bin having an assigned range of factor values that includes the associated factor value included in the health status data, determining the weight factor assigned to the bin determined, and determining a total failure value for the disk indicative of predicted risk of failure based on, for each disk failure factor, the weight factor determined and the overall factor weight assigned.

3 Claims, 7 Drawing Sheets

(51) Int. Cl.
*G06F 11/30* (2006.01)
*G06F 11/34* (2006.01)

(52) U.S. Cl.
CPC ........ *G06F 11/008* (2013.01); *G06F 11/3034* (2013.01); *G06F 11/3452* (2013.01); *G06F 11/3466* (2013.01)

(58) Field of Classification Search
CPC ........ G06F 21/62; G06F 21/79; G06F 3/0674; G06F 3/0619; G06F 3/0653
USPC ........................................................ 711/114
See application file for complete search history.

(56) References Cited

U.S. PATENT DOCUMENTS

| | | | |
|---|---|---|---|
| 9,244,790 B1* | 1/2016 | Ma | G06F 11/2221 |
| 2007/0079170 A1 | 4/2007 | Zimmer et al. | |
| 2009/0265360 A1* | 10/2009 | Bachwani | G06F 11/008 |
| 2009/0312983 A1 | 12/2009 | Lee et al. | |
| 2014/0223240 A1* | 8/2014 | Patil | G06F 11/3034 |
| | | | 714/47.1 |
| 2014/0344624 A1* | 11/2014 | Nishikawa | G06F 11/0778 |
| | | | 714/37 |
| 2015/0262188 A1* | 9/2015 | Franco | G06Q 30/016 |
| | | | 705/7.21 |

\* cited by examiner

SYSTEM AND METHOD FOR PREDICTING DISK FAILURE

FIELD OF THE INVENTION

The present disclosure to digital storage health monitoring. In particular, the present disclosure relates to predicting disk failure.

BACKGROUND OF THE INVENTION

Failure of hard disk drives can be extremely disruptive to users. Such failures can cause loss of data and/or significant delays until a system using a failed disk can recover sufficiently to resume operation. A monitoring system can be used that gathers data which is indicative of disk health. One popular system is Self-Monitoring, Analysis and Reporting Technology (SMART), which can be included in computer hard disk drives and solid-state drives to detect and report various indicators of drive reliability. While standardization of SMART data has been attempted, SMART is still implemented independently by drive manufacturers, wherein each drive manufacturer can define its own set of attributes and corresponding threshold values that define normal operation. Methods for predicting disk failure using SMART data are limited to a particular manufacturer's implementation.

While there is a desire to use the output of disk monitoring systems to predict disk failure, there is a need for disk failure prediction methods that do not rely on SMART data alone or particular manufacturer implementations.

SUMMARY OF THE INVENTION

The purpose and advantages of the illustrated embodiments will be set forth in and apparent from the description that follows. Additional advantages of the illustrated embodiments will be realized and attained by the devices, systems and methods particularly pointed out in the written description and claims hereof, as well as from the appended drawings.

In accordance with a purpose of the illustrated embodiments, in one aspect, a system for predicting failure of a disk that is configured to store digital data is provided. The system includes an information processing system including a processing device and a memory device coupled to the processor, the memory device containing a set of instructions that, when executed by the processing device, cause the processing device to perform operations. The operations include receiving health status data from a monitor that measures health status of the disk, the health status data including factor values associated with a plurality of respective disk failure factors. The operations further include receiving an overall factor weight assigned to each disk failure factor, wherein the overall factor weight indicates a contribution of the associated disk failure factor in predicting failure of the disk. In addition, the operations include receiving, for each disk failure factor, a weight factor assigned to each bin of a set of bins, wherein each bin has an assigned range of factor values, and the weight factor assigned to each bin indicates a probability of disk failure based on empirical results. The operations further include, for each disk failure factor, determining a bin having an assigned range of factor values that includes the associated factor value included in the health status data, and for each disk failure factor, determining the weight factor assigned to the bin determined. The operations further include determining a total failure value for the disk indicative of predicted risk of failure based on, for each disk failure factor, the weight factor determined and the overall factor weight assigned.

In another aspect, a method for predicting failure of a disk that is configured to store digital data is provided that includes receiving user selection of one or more disk failure factors, receiving health status data obtained from monitoring the disk, identifying data included in the health status data that corresponds to the selected disk failure factors, and determining a total failure value for the disk indicative of predicted risk of failure, using the identified data.

In still another aspect, a method for predicting failure of a disk that is configured to store digital data is provided. The method includes operations for receiving health status data from a monitor that measures health status of the disk, the health status data including factor values associated with a plurality of respective disk failure factors. The operations further include receiving an overall factor weight assigned to each disk failure factor, wherein the overall factor weight indicates a contribution of the associated disk failure factor in predicting failure of the disk. In addition, the operations include receiving, for each disk failure factor, a weight factor assigned to each bin of a set of bins, wherein each bin has an assigned range of factor values, and the weight factor assigned to each bin indicates a probability of disk failure based on empirical results. The operations further include, for each disk failure factor, determining a bin having an assigned range of factor values that includes the associated factor value included in the health status data, and for each disk failure factor, determining the weight factor assigned to the bin determined. The operations further include determining a total failure value for the disk indicative of predicted risk of failure based on, for each disk failure factor, the weight factor determined and the overall factor weight assigned.

BRIEF DESCRIPTION OF THE DRAWINGS

The accompanying appendices and/or drawings illustrate various, non-limiting, examples, inventive aspects in accordance with the present disclosure.

DETAILED DESCRIPTION OF CERTAIN EMBODIMENTS

The present disclosure is now described more fully with reference to the accompanying drawings, in which an illustrated embodiment of the present disclosure is shown. The present disclosure is not limited in any way to the illustrated embodiment as the illustrated embodiment described below is merely exemplary of the disclosure, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the present disclosure. Furthermore, the terms and phrases used herein are not intended to be limiting but rather to provide an understandable description of the disclosure.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, exemplary methods and materials are now described. It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the embodiments of this disclosure as discussed below are preferably a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described below.

Figure 1:
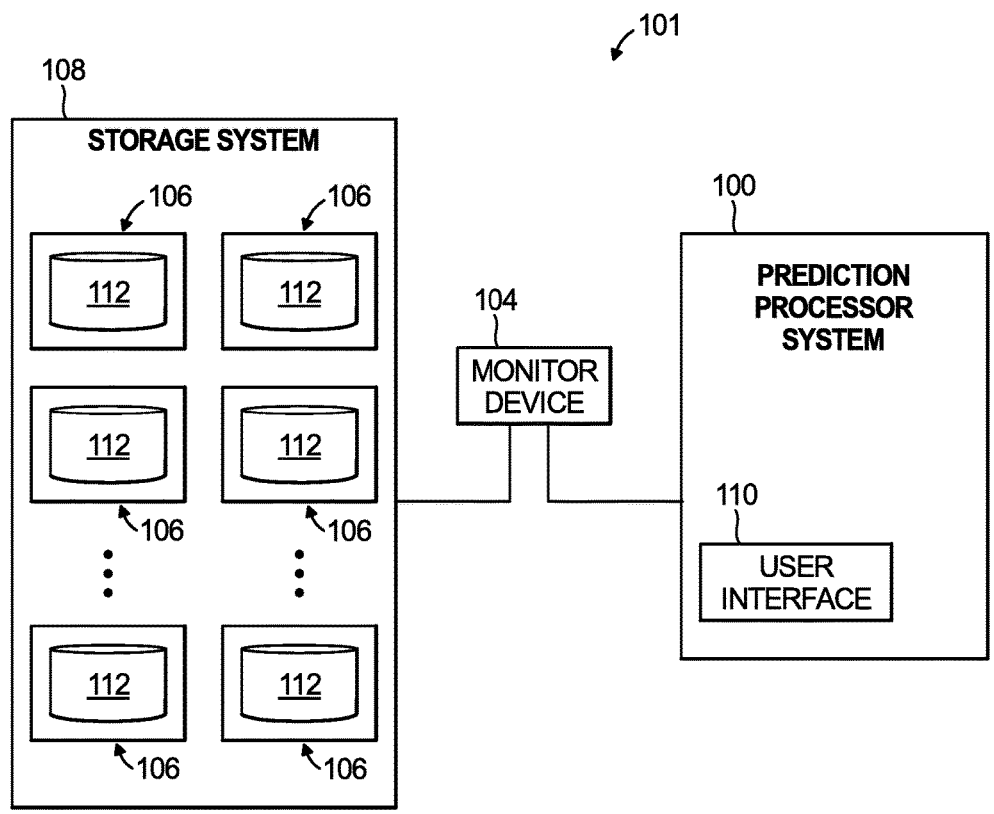
FIG. 1 illustrates a block diagram of a digital storage health monitoring system including an exemplary prediction processor system receiving data from a monitor device that monitors one or more disks in a storage system in accordance with embodiments of the disclosure.

Turning now descriptively to the drawings, in which similar reference characters denote similar elements throughout the several views, FIG. 1 depicts a digital storage health monitoring system 101 in which illustrated embodiments of the present disclosure may be implemented.

The digital storage health monitoring 101 includes a prediction processor system 100 that receives health status information from a monitor device 104 that monitors one or more disk systems 106 provided in a storage system 108. The monitor device 104 can include a processing device that executes software to analyze performance of the disk systems 106 in storage system 108 and outputs data or statistics about the performance. An example of data about hard disk or solid state disk performance is Self-Monitoring, Analysis and Reporting Technology (SMART) data.

The prediction processor system 100, monitor device 104, and/or storage system 108 can be combined, in any combination, such as by being housed in the same housing, sharing one or more physical components, and/or sharing one or more software components.

The storage system 108 can include hardware and/or software for mounting and managing systems 106. The disk systems 106 include one or more disks 112. The disks can use a RAID configuration, without limitation to a particular such configuration. Each disk 112 is a disk that is configured to store digital data. Examples of disks 112 include, without limitation, a hard disk or a solid state disk. Disk systems 106 can include one or more disk drives (not shown). The disk 112 typically provides a large data storage capacity for nonvolatile storage. The monitor device 104 can include one or more devices that are installed on the disk systems 106 (e.g., the disk drive) or communicates with the disk systems 106 to gather data or statistics about performance of the disk systems 106. The monitor device 104 can include a processing device that is linked to the disk systems 106 via communication links that can include wired and/or wireless links, such as to access logs maintained by the disk drives 112. The monitor device 104 and the storage system 108 or disks 112 can communicate, for example, via a network, such as a local access network (LAN) or wide access network (WAN), such as the Internet. In embodiments, the monitor device 104 can be a virtual device. The monitor device executes software to obtain data or statistics related to performance of the disk 112 that can indicate present or future health of the disk 112.

Monitor device 104 can include hardware, firmware, and/or software used to capture disk data. For example, monitor device 104 can include software that calculates disk usage based on number and frequency of reads, writes or other factor that can be used as predictor for a disk failure. A portion of the failure factor can also be determined from logs of equipment that employ disks for data storage. Examples of monitor devices 104 include Tektronix® probes, such as the G10™ and GeoBlade® models, etc. In another example, monitor device 104 includes hardware, firmware, and/or software that generate SMART data, which can be provided, for example, by disk manufacturers of disks 112.

In embodiments the monitor device 104 can include a physical device that is installed on or physically coupled to one or more of the disk systems 106 that calibrates positioning times and spindle speeds of a disk. The monitor device 104 monitors the associated disk's 112 performance and outputs data or statistics about the performance. In embodiments, the monitor device 104 can access logs, e.g., generated by a probe, that record errors, such as read failure and physical hardware allocation errors. The data or statistics about disk performance is referred to herein as health status data.

The prediction processor system 100 can receive data from the monitor device 104, wherein the term "receive," as used herein in association with data, refers broadly to getting the data, such as by receiving a transmission, accessing stored data, reading data, or otherwise obtaining data. The prediction processor system 100 and the monitor device 104 can communicate via a communication link that can include wired and/or wireless links, wherein a portion, or all, of such links can be included in a network, such as a local access network (LAN) or wide access network (WAN), such as the Internet. In embodiments, a portion, or all, of the monitor device 104 can be incorporated into the prediction processor system 100, including sharing hardware components.

Figure 2:
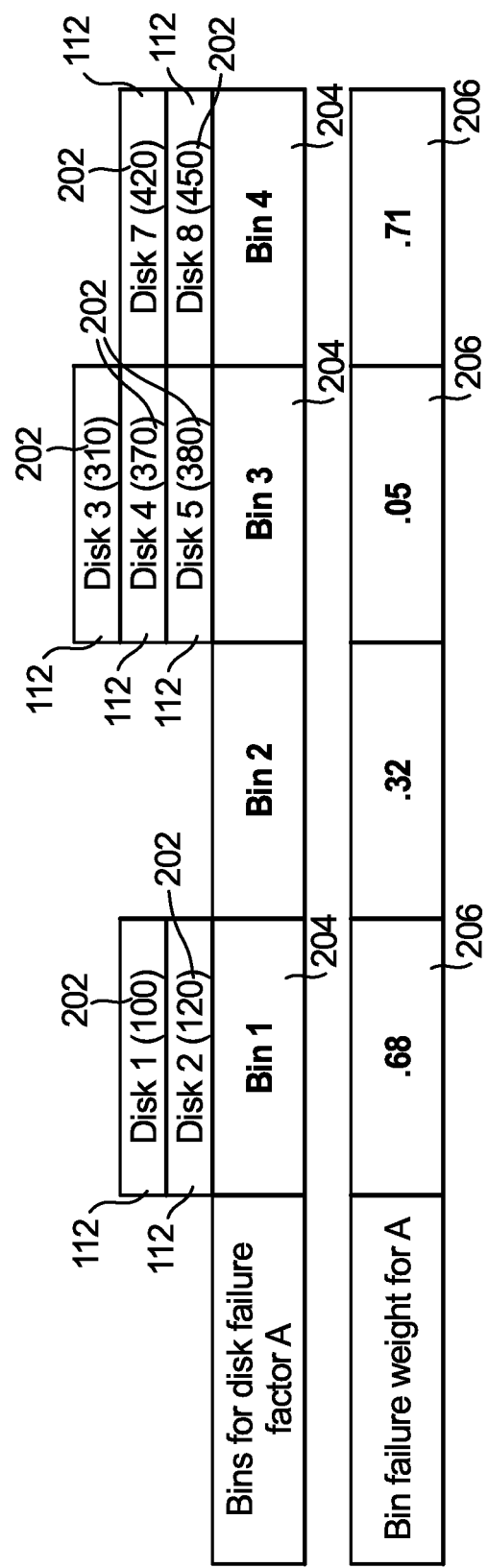
FIG. 2 illustrates a table that correlates factor values and bin failure weights to a set of bins associated with to disk failure factor in accordance with embodiments of the disclosure.

With reference to FIG. 2, a table 200 shows factor values 202 for respective disks 204 (e.g., disk systems 106), numbered 1-8, with respect to a particular disk failure factor A. Disk failure factors are factors that can be calculated from or included in the health status data output by the monitor device 104. Examples of disk failure factors associated with the disk include age, number of uncorrected read errors, number of uncorrected write errors, non-medium error count, number of sector reallocations, number of defects, SMART health status score, number of delayed reads, number of delayed writes, number of acceleration or deceleration of errors, and results of text mining of log messages. A portion, or all, of the disk failure factors can be calculated from SMART data. In this disclosure, disk failure factors are labeled A, B, C, D, etc. The factor values 202 are determined empirically from the health status data received from the monitor device 104, as described above. The factor values 202 are classified into bins 204. The bins 204 can have equal sizes or variable sizes. Optimizing bin width based on the factor value 202, such as by using a method for binning by own value, can result in higher accuracy. In the example shown, the bins 204 have equal sizes. A first bin 204, labeled Bin 1, has factor values 202 for disk failure factor A between 100 to 200; a second bin 204, labeled Bin 2, has factor values 202 for disk failure factor A between 200 to 300; a third bin 204, labeled Bin 3, has factor values 202 for disk failure factor A between 300 to 400; a fourth bin 204, labeled Bin 4, has factor values 202 for disk failure factor A between 400 to 500. In the example, factor values are provided for disk failure factor A include 100, 120, 310, 370, 380, 420, 450, each of which is classified into the appropriate bin 204.

Failure factor values can be provided in any form, for example, numeric or text. Binning schemes that provide for allocating a numeric value to bin failure weights associated with each bin can be devised by users.

Table 200 shows a bin failure weight 206 associated with each bin 204. The bin failure weight 206 indicates a degree of failure associated with that bin 204. Bin failure weights 206 associated with each bin 204 can be assigned based on observed failure probability of disks 112 included in the bin 204. Bins 204 can have a maximum bin failure weight 206 that ranges between 1 (indicating a high likelihood of failure) and a minimum value of 0 (indicating a low likelihood of failure). Likelihood of failure values can be calculated and assigned based on user discretion. The values illustrated in FIG. 2 are provided for illustrative purposes only.

Figure 3:
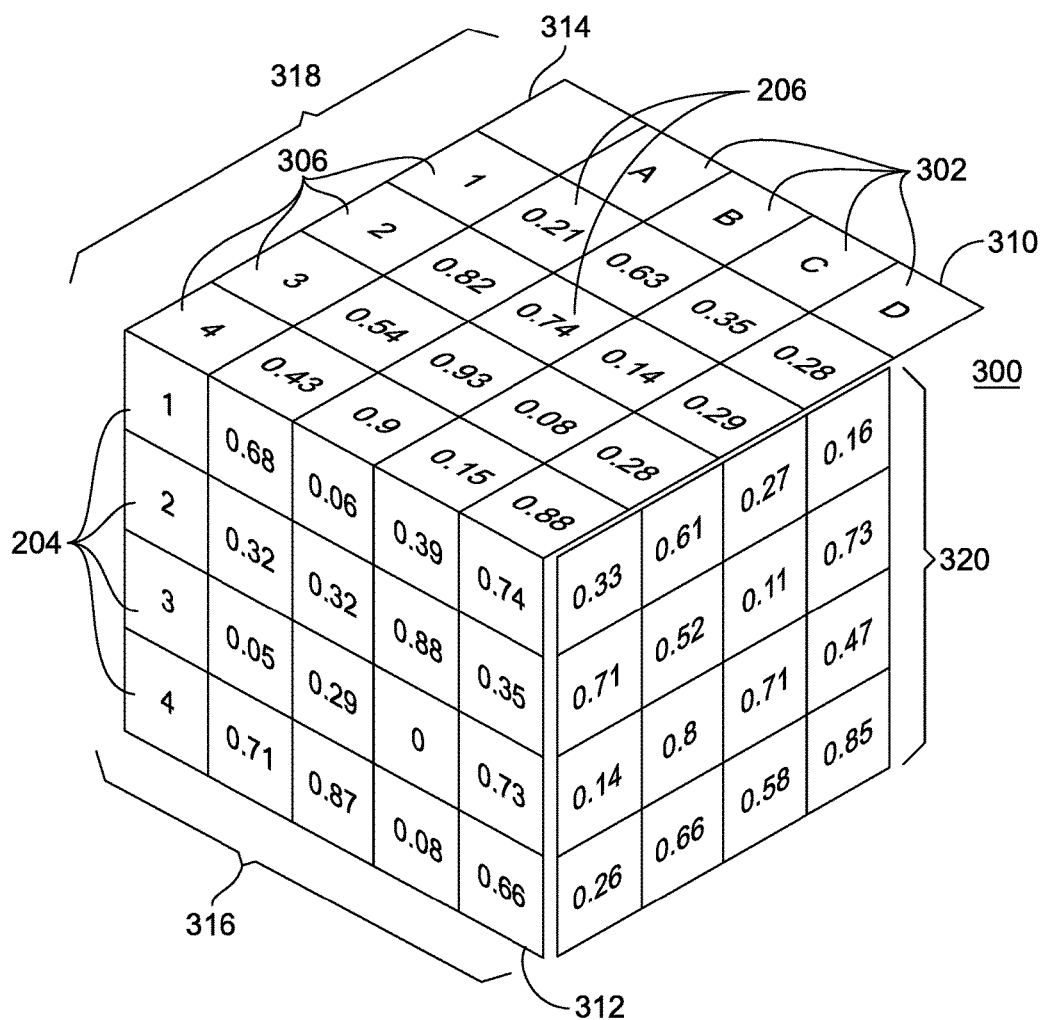
FIG. 3 illustrates a three-dimensional matrix showing bin failure weights in relation to a variety of factors, including bins, disk failure factor, and umbrella failure factor, in accordance with embodiments of the disclosure.

With reference to FIG. 3, a three-dimensional matrix 300 is shown. The matrix 300 includes bin failure weights 206 based on multiple factors, including disk failure factor 302 shown along a first axis 310, bins 204 shown along a second axis 312, and umbrella failure factor 306 shown along a third axis 314. The matrix 300 is shown with four values along each axis 310, 312, 314 for illustrative purposes only. It is to be understood that the matrix 300 is not limited to a particular number of values along any of the axes 312, 314, 316.

The umbrella failure factors 306 are major disk failure factors that can have an umbrella effect on multiple, or all, of the disk failure factors 302. Usage of umbrella failure factors 306 can be helpful in various scenarios, such as ranking disks within a set of multiple disks by failure probability. An example umbrella failure factor 306 is age, since age can have an umbrella effect on other disk failure factors, such as uncorrected read errors and sector reallocations.

Applying the umbrella failure factors 306 includes assigning bin failure weights 206 to each to the disk failure factors 302 based on a combination of the umbrella failure factor 306 and the disk failure factor 302. When an umbrella failure factor 306 is used in combination with the other disk failure factors 302 to determine bin failure weights 206, then bin failure weights 206 should not be applied to the umbrella failure factor 306 as a separate disk failure factor 302 (such as, in the example shown in FIG. 3, a fifth disk failure factor E), since its impact has already been factored in.

Matrix 300 includes three separate two-dimensional tables, namely first table 316, second table 318, and third table 320. In the first table 316, the bin failure weights 206 entered correspond to disk failure factors 302 (A-D) versus bins 204 (1-4). In the second table 318, the bin failure weights 206 entered correspond to bin weights using umbrella failure factors 306 (1-4) versus disk failure factors 302 (A-D). In the third table 320, the bin failure weights 206 entered correspond to umbrella failure factors 306 (1-4) versus bins 204 (1-4).

The bin weights shown in FIG. 3 are for illustrative purposes only. Other examples of bin weights, without limitation, include a bin failure weight associated with fixed length bins, a bin failure weight associated with variable length bins, a combined failure factor based on the actual factor value and its effect on a particular umbrella factor. Tables 316, 318 and 320 show three example methods to calculate bin weights. In table 316, bin weights are obtained based on user discretion. In table 318, bin weights are obtained based on an umbrella failure factor's (e.g., Factor y E) effect on a particular failure factor. In table 320, a complex bin failure weight is obtained that is calculated based on variable bin sizes that use non-uniform binning, or based on cumulative bin weights using an umbrella failure factor, user experience, actual factor values, and/or other weighing and/or binning schemes as selected by the user.

Figure 4:
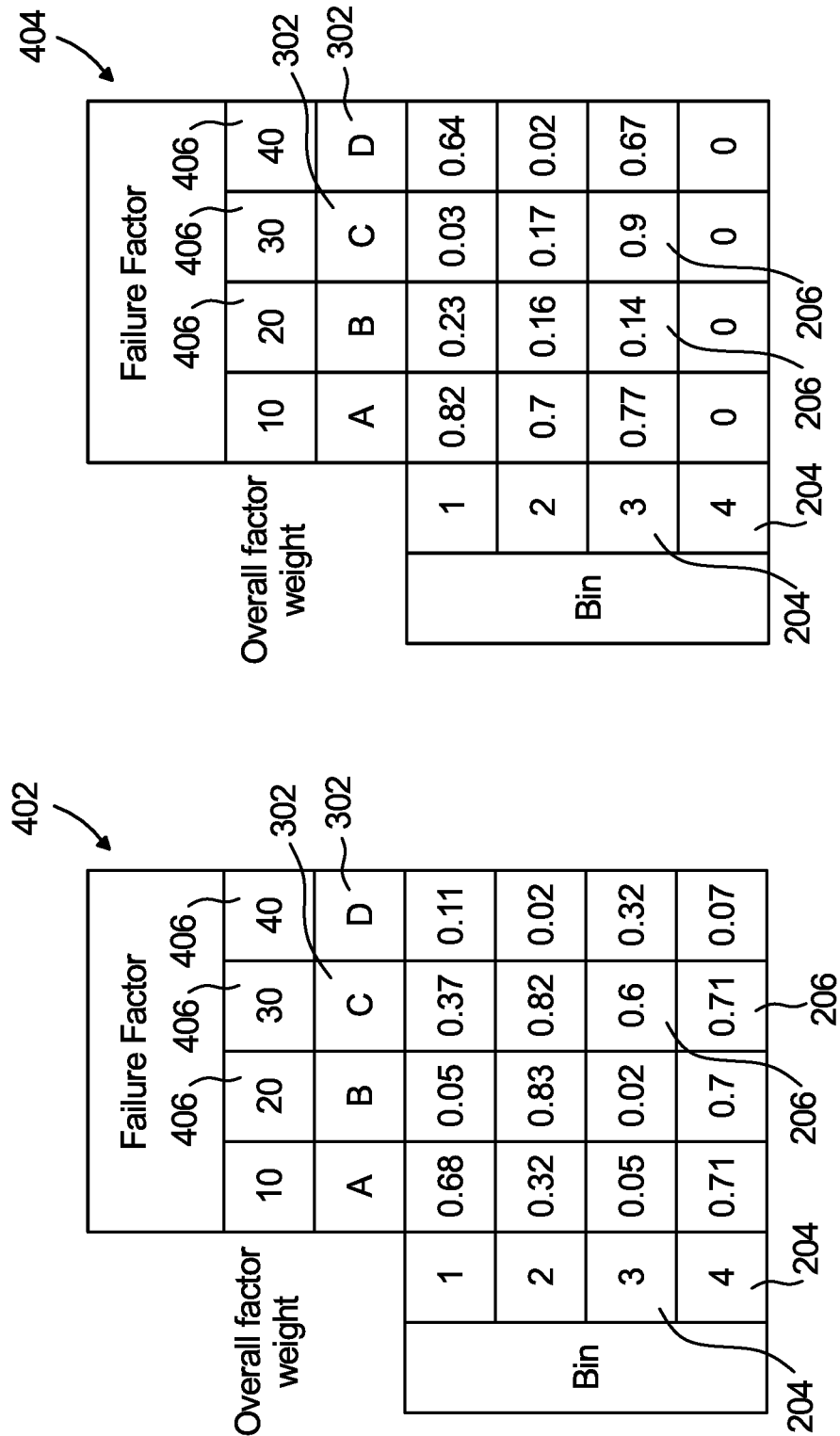
FIG. 4 illustrates two-dimensional matrices showing bin failure weights and overall factor weights in relation to bins and disk failure factors in accordance with embodiments of the disclosure.

FIG. 4 shows tables 402 and 404 that include an additional factor overall factor weight 406 that can be applied when predicting disk failure. Tables 402 and 404 show an overall factor weight 406 that indicates the contribution of the disk failure factor 302 in predicting failures. In the example shown, overall factor weights 406 assigned to disk failure factors 302 labeled A, B, C, and D are 10, 20, 30, and 40, respectively. In this example, disk failure factor 302, labeled B, has twice the contribution to disk failure than disk failure factor 302, labeled A.

Equation (1) below represents an example formula for calculating a total failure value for a particular disk in the storage system (e.g., storage system 108 in FIG. 1).

$$(\text{Total failure value})i = \frac{\sum((\text{Bin failure weight for factor } A)i * \text{Overall factor weight of factor } A) + ((\text{Bin failure factor for factor } B)i * \text{Overall factor weight of factor } B) + \ldots}{\sum(\text{Overaall factor weight of } A + \text{Overall factor weight of } B + \ldots)}$$

In Equation (1), i represents the ith disk. For any particular failure factor, a disk is assigned to only one bin. Once the bin the disk is assigned to for that particular factor is identified, the bin failure weight and bin failure factor that correspond to the bin associated with each failure factor are used to calculate the total failure value for the ith disk using Equation (1).

Equation (1) uses bin failure weights 206 that are applied to selected disk failure factors 302, which can optionally be combined with umbrella failure factors 306, without limitation to the number of disk failure factors 302 used. For example, the bin failure weights can be obtained from any of tables 316, 318 or 320. The disk failure factors 302 can be selected based, at least in part, on a standard used by the monitor device 104, such as in SMART data output by the monitor device 104. In a scenario in which the monitor device 104 does not follow a predefined standard, the disk failure factors 302 can be selected to customize the analysis to conform to the health status data output by the monitor device 104. In addition, the disk failure factors 302 can be selected to use only a portion of the health status data output by the monitor device 104.

Accordingly, Equation (1) can be independent of disk manufacturer and transport protocols used to communicate with the disk. Equation (1) can be used when disk manufacturers and monitor device manufacturers do not comply with conventional reporting standards, such as SMART.

In one scenario, the disk failure factors 302 used for obtaining the bin failure weights 206 can be selected based on information in the health status data that is identified to correspond to a desired set of disk failure factors. The user may desire, for example, to use bin failure weights 206 associated with twelve disk failure factors, however may actually use only ten disk failure factors 302 that could actually be identified in the health status data output by the monitor device 104. The user can select to do a cursory analysis based on a single or a small number of disk failure factors 302, or the user can select a relatively large number of disk failure factors 302 for heightened accuracy.

A user can select to use bin failure weights 206 that are included in a selected table of the first and second tables 316, 318, and 320. For example, a user can select to use Equation (1) with bin failure weights 206 from the second or third tables 318 and 320 that apply the umbrella failure factor 306 to the disk failure factors 302, and thus are based on interdependence between device failure factors 302 and umbrella failure factors 306. Alternatively, the user can select to use Equation (1) with bin failure weights 206 from the first table 316 that does not apply the umbrella failure factor 306 to the disk failure factors 302, treating the device failure factors 302 and umbrella failure factors 306 as independent of one another.

In embodiments, users can decide to use bin failure weights for one failure factor from one table and another failure factor from another table based on the weighing scheme/binning scheme for the factor. For example, Factor A can use a same binning scheme as table 316 and hence use bin weights entered in table 316, while factor B can use a same combination of a weighing scheme and a binning scheme as table 318 and hence use bin weights entered in table 318.

With reference to FIG. 1, a user interface 116 is provided. A user can customize the analysis by entering selections via the user interface 116. For example, the user can select which disk failure factors 302 and/or umbrella failure factors 306 to use in the analysis or which bin failure weights to apply (e.g., the bin failure weights included in the first, second or third table, 316, 318, 320). The bin failure weights, which are determined empirically from observed failure probability of disks in a bin, can be entered via the user interface or provided by a processor.

In an example scenario using the binning scheme of table 316, a life cycle of a particular disk is known to end at six years. In this scenario, the user can attribute disk degradation to age, which in this example corresponds to failure factor E. A bin weight of 0 is assigned to bin 1, which corresponds to disks having ages between 0 to 2 years, a bin weight of 0.5 is assigned to bin 2, which corresponds to disks having ages between 2 to 4 years, and a bin weight of 1.0 is assigned to bin 3, which corresponds to disks having an age between 4 to 6 years. In this example, a maximum value of 1 indicates a high likelihood of failure, and a minimum value of 0 indicates a low likelihood of failure.

When the age failure factor E is used as an umbrella failure factor, bin weights for another failure factor, such as A, can be calculated as if A's value is between 100 to 200, which corresponds to bin 1 for failure factor A in this example. Those disks assigned to bin 1 that have an age greater than 3 years are assigned a higher bin failure weight (indicating a higher likelihood of failure) than disks assigned to bin 1 that have an age between 0 and 2.

The result of Equation (1) can be compared to one or more thresholds that qualitatively define the health status of the disk. For example, depending on which threshold is exceeded, the health of the disks can be categorized as belonging to different zones, such as a red, yellow, or green zone. For example, when the result is above a first threshold, the disk analyzed is determined to be in a red zone that indicates the disk needs to be replaced soon; when the result is above a second threshold and below the first threshold, the disk analyzed is determined to be in a yellow zone that indicates that disk recovery methods should be applied to the disk, such as diagnostic and repair systems for verifying file system integrity of a volume, fixing logical file system errors, and/or checking and repairing file systems errors; and when the result is below or equal to the second threshold, the disk analyzed is determined to be in a green zone that indicates the disk is in good health. Users can use this scheme to calculate a mean time to failure (MTTF) for disk(s).

Accordingly, Equation (1) can be applied to generate a numeric result or a qualitative result. The numeric or qualitative results can be output to the user, e.g., via the GUI.

Figure 5:
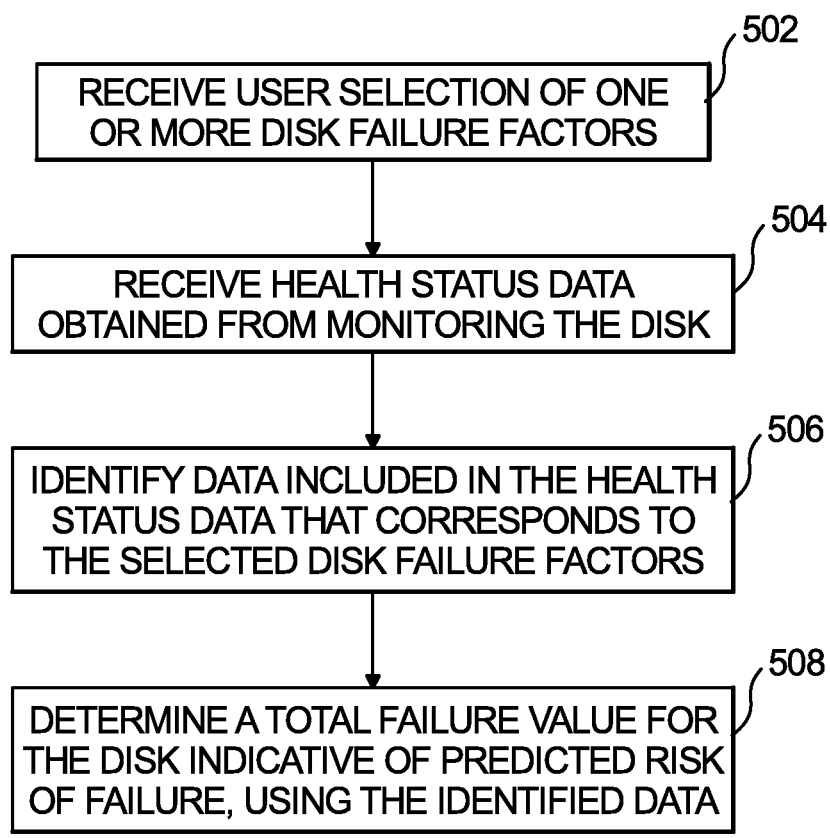
FIG. 5 illustrates a flowchart of operations performed by the prediction processor system shown in FIG. 1, in accordance with embodiments of the disclosure.
Figure 6:
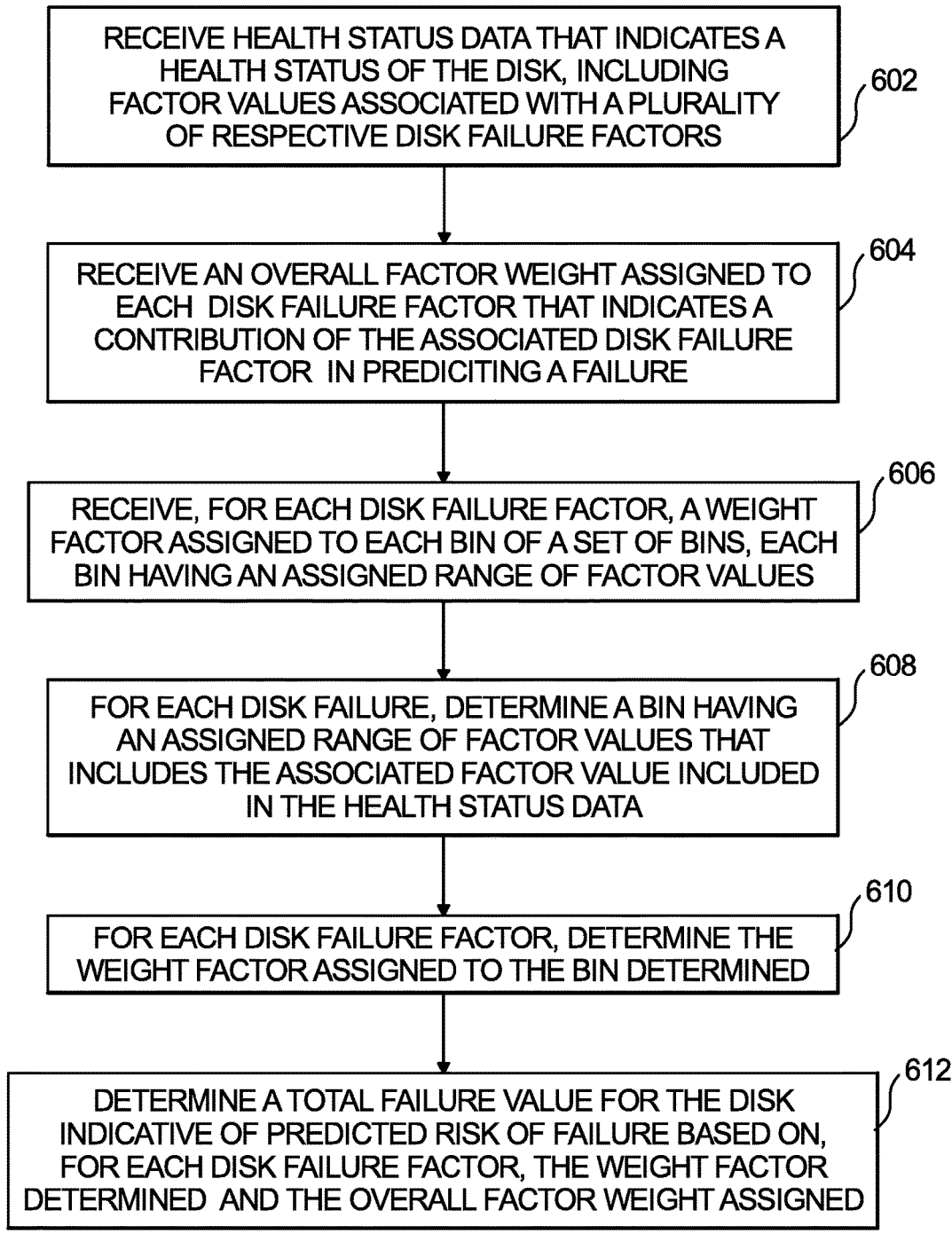
FIG. 6 illustrates a flowchart of operations performed by the prediction processor system illustrated in FIG. 1, in accordance with further embodiments of the disclosure.

With reference now to FIGS. 5 and 6, shown are flowcharts demonstrating implementation of the various exemplary embodiments. It is noted that the order of operations shown in FIGS. 5 and 6 is not required, so in principle, the various operations may be performed out of the illustrated order. Also certain operations may be skipped, different operations may be added or substituted, or selected operations or groups of operations may be performed in a separate application following the embodiments described herein.

Language that refers to the exchange of information is not meant to be limiting. For example, the term "receive" as used herein refers to obtaining, getting, accessing, retrieving, reading, or getting a transmission. Use of any of these terms is not meant to exclude the other terms. Data that is exchanged between modules can be exchanged by a transmission between the modules, or can include one module storing the data in a location that can be accessed by the other module.

FIG. 5 shows a flowchart of operations performed by the prediction processor system 100 in accordance with embodiments of the disclosure. At operation 502, a user selection of one or more disk failure factors is received. At operation 504, health status data obtained from monitoring the disk is received. At operation 506, data included in the health status data that corresponds to the selected disk failure factors is identified. At operation 508, a total failure value for the disk indicative of predicted risk of failure is determined using the identified data.

Accordingly, a user can select disk failure factors according to the analysis they choose, providing an opportunity to improve accuracy of the analysis by adding disk failure factors that are available in the health status data, such as when new health status data becomes available with advances in technology. The method does not depend on a particular standard of health status data or protocols for acquiring the health status data, such as may be imposed by a manufacturer of the disk or disk drive.

FIG. 6 shows a flowchart of operations performed by the prediction processor system 100 in accordance with further embodiments of the disclosure. At operation 602, health status data that indicates a health status of the disk is received. The health status data can include factor values that are associated with a plurality of respective disk failure factors. At operation 604, an overall factor weight assigned to each disk failure factor is received. The overall factor weight indicates the contribution of the associated disk failure factor in predicting a failure. At operation 606, a weight factor assigned to each bin of a set of bins is received for each disk failure factor.

Each bin has an assigned range of factor values. The weight factor assigned to each bin indicates a probability of disk failure based on empirical results.

At operation 608, for each disk failure factor, a bin is determined that has an assigned range of factor values that includes the associated factor value included in the health status data. At operation 610, for each disk failure factor, the weight factor is determined that is assigned to the bin that was determined in operation 608. At operation 612, a total failure value for the disk is determined, wherein the total failure value is indicative of predicted risk of failure. The total failure value is determined based on, for each disk failure factor, the weight factor determined and the overall factor weight assigned.

In embodiments, the operations can include receiving a user selection of the disk failure factors, identifying the selected disk failure factors that are present in the health status data, and determining the total failure value for the disk based on the identified disk failure factors. Thus, the method does not depend on a particular standard of health status data or protocols for acquiring the health status data, such as may be imposed by a manufacturer of the disk or disk drive.

Additionally, in embodiments, the health status data can further include a factor value associated with the umbrella failure factor, wherein the umbrella failure factor is a factor that has been determined to be likely to affect the probability of disk failure associated with the respective disk failure factors. The received weight factors assigned to the bins of the set of bins for respective disk failure factors can be further based on factor values associated with the umbrella failure factor. Determining the bin for each disk failure factor can include determining a bin that has an assigned range of factor values that includes the factor value included in the health status data that is associated with the umbrella failure factor.

In embodiments, the total failure value determined can be assigned to a category based on its value, such as a red category that indicates the disk should be replaced soon; a yellow category that indicates further diagnostics (e.g., a checking or scanning diagnostic procedure) should be performed, such as to the filing system; and a green category that indicates the disk has been determined be in good health. The operations can include outputting an indication of the category determined.

In summary, embodiments of the present disclosure are directed to a computational technique for determining a disk's level of risk of failure based on health status data for one or more disk failure factors obtained from monitoring the disk, bin placement for each disk failure factor, bin failure weights assigned to the bins, overall factor weight assigned to the disk failure factors, and optionally an overall failure factor that can influence many of the disk failure factors. Advantageously, this technique provides flexibility, such that disk failure factors used in the analysis can be selected and identified in the health status data. Total failure value can also be used to derive MTTF for disks.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 7:
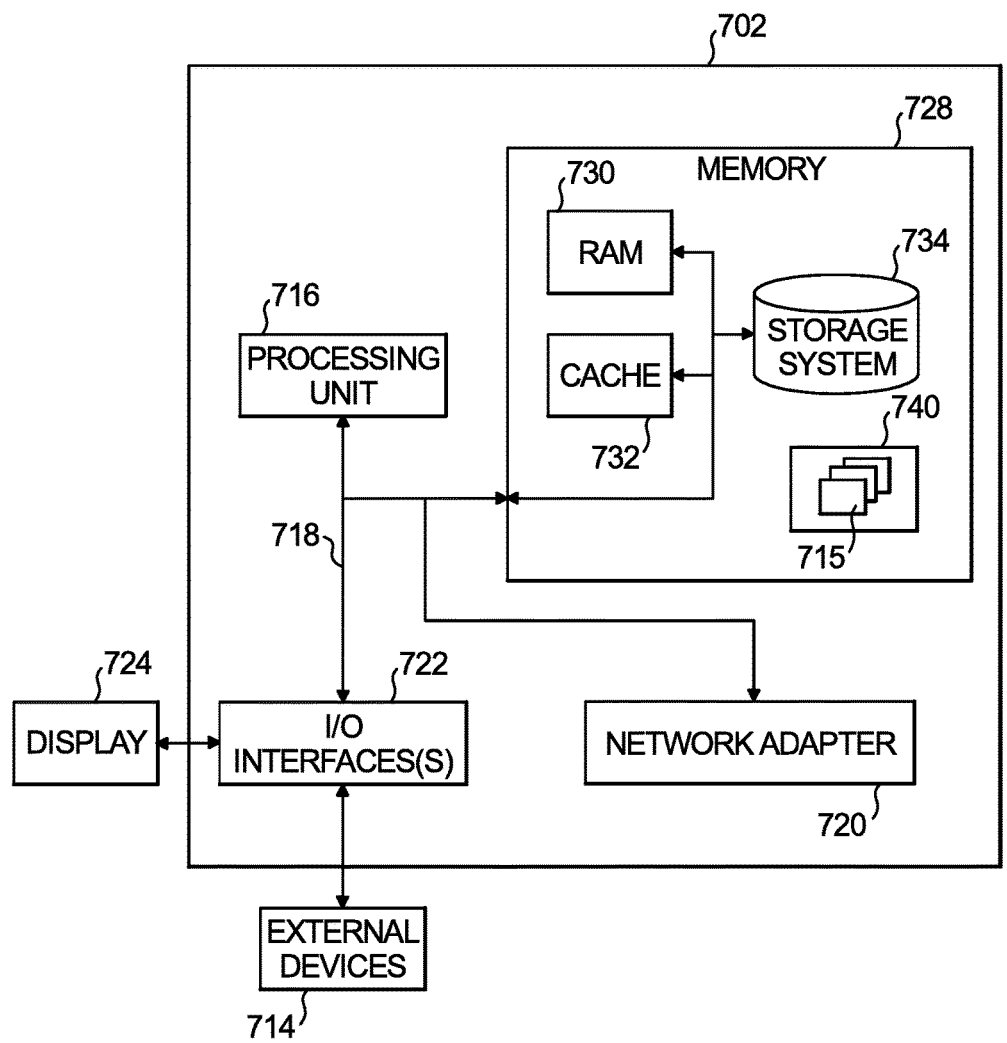
FIG. 7 illustrates internal and external components of the prediction processor system illustrated in FIG. 1 in accordance with embodiments of the disclosure.

Embodiments of prediction processor system 100 may be implemented or executed by one or more computer systems. One such computer system, processor system 702 is illustrated in FIG. 7. In various embodiments, processor system 702 may be a server, a mainframe computer system, a workstation, a network computer, a desktop computer, a laptop, or the like.

Processor system 702 is only one example of a suitable system and is not intended to suggest any limitation as to the scope of use or functionality of embodiments of the disclosure described herein. Regardless, processor system 702 is capable of being implemented and/or performing any of the functionality set forth hereinabove.

Processor system 702 is operational with numerous other general purpose or special purpose computing system environments or configurations. Examples of well-known computing systems, environments, and/or configurations that may be suitable for use with processor system 702 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed data processing environments that include any of the above systems or devices, and the like.

Processor system 702 may be described in the general context of computer system-executable instructions, such as program modules, being executed by a computer system. Generally, program modules may include routines, programs, objects, components, logic, data structures, and so on that perform particular tasks or implement particular abstract data types. Processor system 702 may be practiced in distributed data processing environments where tasks are performed by remote processing devices that are linked through a communications network. In a distributed data processing environment, program modules may be located in both local and remote computer system storage media including memory storage devices.

Processor system 702 is shown in FIG. 7 in the form of a general-purpose computing device. The components of processor system 702 may include, but are not limited to, one or more processors or processing units 716, a system memory 728, and a bus 718 that couples various system components including system memory 728 to processor 716.

Bus 718 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Processor system 702 typically includes a variety of computer system readable media. Such media may be any available media that is accessible by processor system 702, and it includes both volatile and non-volatile media, removable and non-removable media.

System memory 728 can include computer system readable media in the form of volatile memory, such as random access memory (RAM) 730 and/or cache memory 732. Processor system 702 may further include other removable/non-removable, volatile/non-volatile computer system storage media. By way of example only, storage system 734 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 718 by one or more data media interfaces. As will be further depicted and described below, memory 728 may include at least one program product having a set (e.g., at least one) of program modules that are configured to carry out the functions of embodiments of the disclosure.

Program/utility 740, having a set (at least one) of program modules 715 may be stored in memory 728 by way of example, and not limitation, as well as an operating system, one or more application programs, other program modules, and program data. Each of the operating system, one or more application programs, other program modules, and program data or some combination thereof, may include an implementation of a networking environment. Program modules 715 generally carry out the functions and/or methodologies of embodiments of the disclosure as described herein.

Processor system 702 may also communicate with one or more external devices 714 such as a keyboard, a pointing device, a display 724, etc.; one or more devices that enable a user to interact with processor system 702; and/or any devices (e.g., network card, modem, etc.) that enable processor system 702 to communicate with one or more other computing devices. Such communication can occur via Input/Output (I/O) interfaces 722. Still yet, processor system 702 can communicate with one or more networks such as a local area network (LAN), a general wide area network (WAN), and/or a public network (e.g., the Internet) via network adapter 720. As depicted, network adapter 720 communicates with the other components of processor system 702 via bus 718. It should be understood that although not shown, other hardware and/or software components could be used in conjunction with processor system 702. Examples, include, but are not limited to: microcode, device drivers, redundant processing units, external disk drive arrays, RAID systems, tape drives, and data archival storage systems, etc.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method for predicting failure of a disk in a digital storage system configured to store digital data, comprising:
    receiving user selection of one or more disk failure factors;
    receiving health status data obtained from monitoring the disk;
    identifying data included in the health status data that corresponds to the user selection of one or more disk failure factors; and
    determining a total failure value for the disk indicative of predicted risk of failure, using the identified data and based on a three dimensional matrix for determining bin failure weights wherein the matrix is defined by separate first, second and third two-dimensional tables, the matrix including includes a disk failure factor along a first axis, bins along a second axis and an umbrella failure factor along a third axis, wherein the first two-dimensional table includes bin failure weights entered corresponding to disk failure factors versus bins, the second two-dimensional table includes bin failure weights entered corresponding to bin weights using umbrella failure factors versus disk failure factors and the third two-dimensional table includes bin failure weights corresponding to umbrella factors versus bins, and wherein the total failure value is determined based on empirical data associated with the selected one or more disk failure factors.

2. The method of claim 1, further comprising:
    receiving user selection of an umbrella failure factor, the umbrella failure factor being a factor determined to be likely to effect the probability of disk failure associated with the respective selected disk failure factors; and
    identifying data included in the health status data that corresponds to the selected umbrella failure factor,
    wherein determining the total failure value for the disk further includes using empirically determined data associated with the umbrella failure factor and the data identified that corresponds to the selected umbrella failure factor.

3. The method of claim 1, further comprising:
    monitoring the disk; and
    outputting the health status data based on the monitoring.

\* \* \* \* \*